2,769,014

Patented Oct. 30, 1956

2,769,014

PROCESS FOR THE PREPARATION OF NOVEL PERFUMES CONTAINING AN M-DIOXANE RING

Muus Gerrit Jan Beets, Hilversum, Netherlands, assignor to N. V. Polak & Schwarz's Essencefabrieken, Hilversum, Netherlands, a corporation of the Netherlands No Drawing. Application May 16, 1952, Serial No. 288,315

Claims priority, application Netherlands May 17, 1951

5 Claims. (Cl. 260—340.3)

It is known that aryl alkenes in which the double bond with the aromatic nucleus is conjugated under the influence of acid catalysts, such as sulphuric acid, can react with formaldehyde under formation of m-dioxane derivatives. This can be illustrated by the following reaction scheme:

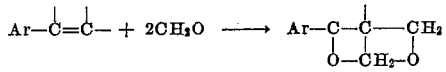

None of the derivatives of this type which have become known so far has, however, appeared to be suitable as an odoriferous substance. The derivatives of aryl alkenes with larger molecules such as anethole, methylisoeugenole and others are practically odourless, whereas those from compounds such as styrene, methyl styrene and the like have unsuitable, little agreeable smelling properties.

It is therefore surprising that meta-dioxane derivatives prepared from cyclic hydrocarbons containing an aromatic nucleus and in a ring fused-on to said nucleus a double bond which is conjugated with the aromatic nucleus appeared to form an interesting group of perfumes.

The odour they have can be said to be very exceptional in the series of the organic compounds which are composed only of oxygen, hydrogen and carbon. However, the starting products can have all kinds of substituents, such as halogen, hydroxyl, etc. in arbitrary positions.

The reaction is carried out by having formaldehyde, preferably the aqueous solution obtainable in the market, under the influence of mineral acid, preferably sulphuric acid, act on an aryl alkene of the above mentioned type at increased temperature, lying preferably at or immediately below the reflux point of the mixture. The quantity of the acid and the reaction time somewhat depend on the reactivity of the used starting material. At least 2 molecules of formaldehyde to 1 molecule of the aryl alkene should be used, preferably more, however, this in respect of the losses of formaldehyde; moreover an excess of formaldehyde probably counteracts the formation of di-indene. By "formaldehyde" are also comprised its polymers, such as para-formaldehyde.

Insofar as known to applicant the group of compounds described herein, having in general the following structure:

in which X is an atom group completing the ring fused-on to the aromatic nucleus, has not yet been described in the literature.

The invention is elucidated by the following examples, but not at all restricted thereto:

Example I

Bring 1226 g. of 37% formaldehyde solution (15.1 molecules) into a round bottomed flask fitted with a stirrer, thermometer and cooler. Add under stirring: 162 g. of sulphuric acid and thereupon 702 g. of 1.2-dihydronaphthalene (5.4 molecules). Heat to 90° C. and stir during 6 hours at this temperature, cool and extract the oil-layer into benzene, wash to neutral reaction and fractionate in vacuum. The clear reaction product displays the following properties: Boiling point 136–137° at 3 mm. $n_D^{20}$ 1.5556; $d_4^{20}$ 1.4158.

Example II

Bring 1125 g. of a 37% formaldehyde solution (13.8 molecules) into a round bottomed flask fitted with a stirrer, thermometer and cooler. Add under stirring: 40 g. of sulphuric acid and thereupon 580 g. of indene (5 molecules). Stir at 90° C. during 2 hours, cool, work up with benzene and fractionate in a suitable column in vacuum. Recrystallize the product to a constant melting point (36.6–37.4° C.). Yield 55–60% of the theory.

As a by-product a crystallized compound $C_{19}H_{18}O$ is obtained with melting point 134–134.7° which is composed of 2 molecules of indene and 1 molecule of formaldehyde.

Having now particularly described and ascertained the nature of my said invention what I claim is:

1. A process for the preparation of a substance containing an m-dioxan ring, which comprises reacting a substance containing at least 90% by weight of a bicyclic hydrocarbon selected from the group consisting of indene and its homologues and substitution products, and 1.2-dihydronaphthalene, its homologues, with an aldehyde selected from the group consisting of formaldehyde and its polymers, the reaction mixture containing at least two mols of the aldehyde per mol of the bicyclic hydrocarbon, in the presence of a mineral acid, the reaction compounds being stirred together at an operable elevated temperature, and thereupon isolating the substance containing the m-dioxan ring.

2. A process as defined in claim 1, wherein the aldehyde is present in the form of a 30–37% aqueous solution.

3. A process as defined in claim 1, wherein the mineral acid is sulfuric acid.

4. The process as defined in claim 1, wherein the reaction temperature is between about 70° and the boiling point of the reaction mixture.

5. As a new composition of matter, a compound having the structural formula

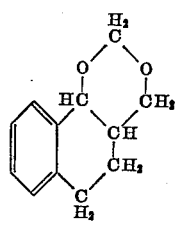

with B. P. 3 mm. 136–137° C., $n_D^{20}$ 1.5556 and $d_4^{20}$ 1.1458 (said compound being a perfume).

References Cited in the file of this patent

UNITED STATES PATENTS

| | | |
|---|---|---|
| 2,356,683 | Mikeska | Aug. 12, 1944 |
| 2,417,548 | Engel | Mar. 18, 1947 |

FOREIGN PATENTS

| | | |
|---|---|---|
| 310,783 | Germany | Oct. 30, 1919 |

OTHER REFERENCES

Beets et al.: Rec. Trav. Chim. 71, pp. 343–53, pub. March 1952, rec'd Sept. 17, 1951.

Beilstein: Handbuch der Org. Chem., vol. XIX, page 44.